United States Patent [19]

Ichikawa et al.

[11] Patent Number: 4,851,207
[45] Date of Patent: Jul. 25, 1989

[54] PROCESS FOR PRODUCING AN ALUMINUM NITRIDE POWDER

[75] Inventors: Hachiro Ichikawa; Masanori Oguni; Akira Murase; Hazuo Horiba, all of Shizuoka; Kenichi Sakamoto, Tokyo; Mikio Kanehara, Shizuoka, all of Japan

[73] Assignee: Nippon Light Metal Co., Ltd., Tokyo, Japan

[21] Appl. No.: 133,827

[22] Filed: Dec. 16, 1987

[30] Foreign Application Priority Data

Dec. 16, 1986 [JP] Japan .................. 61-297590
Dec. 16, 1986 [JP] Japan .................. 61-297591
Mar. 31, 1987 [JP] Japan .................. 62-75985

[51] Int. Cl.$^4$ .............................. C01B 21/06
[52] U.S. Cl. ................................. 423/412
[58] Field of Search .......................... 423/412

[56] References Cited

FOREIGN PATENT DOCUMENTS 1197439  7/1965  Fed. Rep. of Germany ...... 423/412
  77111  5/1985  Japan ............................ 423/412

Primary Examiner—Robert L. Stoll
Assistant Examiner—Wayne A. Lange
Attorney, Agent, or Firm—Sughrue, Mion, Zinn, Macpeak & Seas

[57] ABSTRACT

A process for producing an aluminum nitride powder by reacting a mixture of alumina and carbon with a nitrogen gas, wherein the mixture of alumina and carbon being contacted with a nitrogen-containing inert gas at a temperature of 1,000° to 1,400° C. at a pressure of not higher than 0.1 atmosphere before a reaction is started to form aluminum nitride.

7 Claims, 1 Drawing Sheet

FIG.
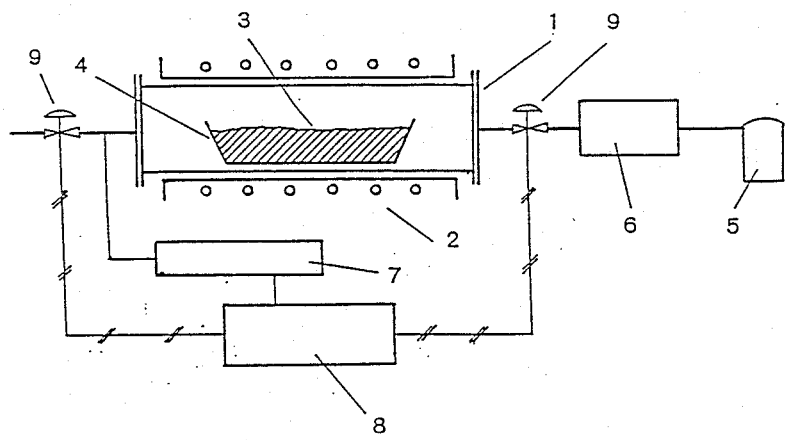

PROCESS FOR PRODUCING AN ALUMINUM NITRIDE POWDER

FIELD OF THE INVENTION

The present invention relates to a process for producing an aluminum nitride powder. In particular, the present invention relates to a process for producing an aluminum nitride powder which has very low contents of cationic impurities or which is additionally characterized by an extremely low content of total oxygen, or unreacted alumina and which comprises particles of small size.

BACKGROUND OF THE INVENTION

Two known methods conventionally used to produce aluminum nitride powders: are (1) firing a mixed composition of alumina and carbon powders in a nitrogen-containing atmosphere as described in Japanese Patent Application (OPI) No. 50008/84 corresponding to U.S. Pat. No. 4,618,592 (the term "OPI" as used herein refers to a "published unexamined Japanese patent application open to public inspection"), and (2) nitriding aluminum by contacting it with a nitrogen gas as described in Japanese Patent Application (OPI) No. 161314/85.

Aluminum nitride powder is useful as the material of choice for manufacturing products such as electrical substrates that require high thermal conductivity. The thermal conductivities of such products are chiefly governed not by free electrons in metals, but by phonons due to lattice vibrations. The degree of phonon conduction depends on what impurities are present in the aluminum nitride powder and on the presence of pores in a sintered body. For instance it is known that thermal conductivity is badly affected not only by the presence of cations such as sodium, iron and silicon ions but also by the inclusion of oxygen from unreacted alumina and other sources. If the powder comprises large particles, it is insufficiently sintered and a substantial amount of pores remains in the sintered product. The presence of such residual pores decreases thermal conductivity determinatively. Therefore, in order to attain high thermal conductivity in electrical substrates and other heat-dissipating products, the powder used as a raw material is required not only to contain few cation impurities but also to comprise small particles which can be easily sintered.

The two prior art methods described above have the disadvantage that the aluminum nitride produced has a tendency to contain residual cationic impurities such as sodium, iron and silicon ions if it is produced by the method described in Japanese Pat. Application (OPI) No. 50008/84 corresponding to U.S. Pat. NO. 4,618,592 and residual cationic impurities such as silicon, iron and magnesium ions if it is produced by the method described in Japanese Patent Application (OPI) No. 161314/85. In addition, the aluminum nitride produced by the former method is liable to contain residual unreacted alumina whereas the product obtained by the latter method has an increased content of total oxygen. The aluminum nitride powders containing such impurities are not suitable for use as materials for manufacturing products such as electrical substrates that require a high degree of purity.

The present inventors conducted intensive studies in order to develop a process for producing an aluminum nitride powder which has low impurity contents and which comprises particles of a small size.

SUMMARY OF THE INVENTION

The present invention basically relates to a process for producing an aluminum nitride powder by reacting a mixture of alumina and carbon with a nitrogen gas. According to one aspect of the present invention, said mixture is contacted with a nitrogen-containing inert gas at a temperature of 1,000° to 1,400° C. at a pressure of not higher than 0.1 atmosphere before a reaction is started to form aluminum nitride.

According to another aspect of the present invention, said mixture is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a super atmospheric pressure, pressure more than one atmospheric pressure, until the conversion of the alumina feed to aluminum nitride reaches at least 5%.

According to a third aspect of the present invention, the mixture of alumina and carbon is contacted with a nitrogen-containing inert gas at a temperature of 1,000 to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a subatmospheric pressure, pressure less than one atmospheric pressure, in the range of 0.2 to 0.8 atmospheres.

According to a fourth aspect of the present invention, the mixture of alumina and carbon is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a superatmospheric pressure until the conversion of the alumina feed to aluminum nitride reaches at least 5%, followed by contacting said mixture with a nitrogen-containing inert gas at a temperature of 1,250° C. or more at a subatmospheric pressure in the range of 0.2 to 0.8 atmospheres.

BRIEF DESCRIPTION OF THE DRAWING

The FIGURE shows a flow chart of an apparatus that may be employed to implement the process of the present invention for producing an aluminum nitride powder.

DETAILED DESCRIPTION OF THE INVENTION

The alumina and carbon feed to be used in the process of the present invention may be prepared by granulating the powders of the individual feeds or the powder of a mixed feed. Typically, the two feeds are used as a mixture of powders themselves.

The nitrogen-containing inert gas to be used in the process of the present invention contains a nitrogen gas and the least amounts of oxygen, carbon dioxide, water vapor and any other gases that have oxidizing effects at elevated temperatures. The incidental inclusion of carbon monoxide as a reaction product is tolerable.

It is known that a mixture of alumina and carbon, when heated to a temperature of 1,250° C. or more in a nitrogen-containing inert gas atmosphere, is converted to aluminum nitride and carbon monoxide according to equation (1):

$$Al_2O_3 + 3C + N_2 = 2AlN + 3CO \qquad (1)$$

Simultaneously with this reaction, cationic impurities present in the alumina and/or carbon feed, such as sodium, silicon, iron, magnesium and calcium are also converted to nitrides or carbides, which remain in the aluminum nitride formed by the reaction scheme (1).

The present inventors conducted studies on a method for minimizing the contents of cationic impurities in aluminum nitride powders. As a result, they found that in order to attain this object, the reaction for forming aluminum nitride must be preceded by a step of contacting the feed mixture with a nitrogen-containing inert gas at a temperature of 1,000° to 1,400° C. at a pressure of not higher than 0.1 atmosphere.

The temperature of the atmosphere to which the feed mixture is exposed at a pressure of not higher than 0.1 atmosphere is in the range of 1,000° to 1,400° C. The pressure of the nitrogen-containing inert gas is held at a pressure of not higher than 0.1 atmosphere for a sufficient period of time to allow the cationic impurities in the alumina/carbon mixture to be substantially removed in the temperature range specified above, and this period is typically at least half an hour.

It is not completely clear why holding the pressure of a nitrogen-containing inert gas at 0.1 atmosphere or less prior to the reaction for the formation of aluminum nitride contributes to the production of an aluminum nitride powder containing cationic impurities at extremely low levels. A reason could be explained as follows. Cationic impurities in the alumina or carbon feed are usually present in the form of oxides and are known to undergo thermal dissociation when heated at elevated temperatures. For example, sodium, silicon and magnesium oxides are dissociated according to the following reaction schemes (2) to (4):

$$Na_2O(s) = 2Na(g) + \tfrac{1}{2}O_2(g) \qquad (2)$$

$$SiO_2(s) = SiO(g) + \tfrac{1}{2}O_2(g) \qquad (3)$$

$$MgO(s) = Mg(g) + \tfrac{1}{2}O_2(g) \qquad (4)$$

The partial pressures at equilibrium of the vapors of the respective compounds are closely related to temperature but all of them are higher than that of alumina and decrease in the following order:

$$Na_2O > SiO_2 > MgO > Al_2O_3.$$

Iron is present in the form of $Fe_2O_3$ and the vapor pressure of $Fe_2O_3$ is higher than that of $SiO_2$. Calcium is present in the form of CaO and its vapor pressure would be lower than that of MgO and higher than that of $Al_2O_3$. As the pressure of the nitrogen-containing inert gas decreases below 0.1 atmosphere, the cationic impurities present in the alumina or carbon feed would be evaporated under their respective vapor pressures, thereby being eliminated from the feed mixture.

In order to remove cationic impurities in the process of the present invention, the nitrogen-containing inert gas is held at a pressure of 0.1 atmosphere or less at a temperature in the range of 1,000° to 1,400° C. Below 1,000° C., the cationic impurities in the feed mixture have such low vapor pressure that they cannot be effectively removed from the system. Above 1,400° C., the vapor pressures of such cationic impurities are increased but it sometimes occurs that the resulting aluminum nitride powder comprises undesirably large particles.

In accordance with the present invention, the nitrogen-containing inert gas must be held at a pressure of not higher than 0.1 atmosphere and at a temperature between 1,000° C. and 1,400° C. for a period that precedes the start of reaction (1) for the formation of aluminum nitride. If this depressurizing step is performed after reaction (1) has started, it does not make any great contribution to the purpose of eliminating cationic impurities.

Taking $SiO_2$ as an example of the cationic impurities present in the alumina/carbon mixed feed, it reacts with carbon and nitrogen in the feed according to the following schemes (5) and (6):

$$SiO_2 + 3C = SiC + 2CO \qquad (5)$$

$$3SiO_2 + 6C + 2N_2 = Si_3N_4 + 6CO \qquad (6)$$

These reactions occur either prior to, or simultaneously with, the reaction (1), thereby producing silicon carbide or silicon nitride, which are by far stabler than silicon oxide at elevated temperatures. As illustrated by this example, after conversion to stabler forms, it could become very difficult to remove cationic impurities from the feed mixture by evaporation if the step of holding the nitrogen-containing inert gas at a pressure of not higher than 0.1 atmosphere at a temperature of between 1,000° C. and 1,400° C. is performed after the reaction (1) has started.

In the heat treatment conducted in the process of the present invention, the nitriding reaction will hardly take place since the pressure of the nitrogen-containing inert gas is held at 0.1 atmosphere or less.

After the feed mixture is heated at a temperature in the range of 1,000° to 1,400° C. at a pressure of not higher than 0.1 atmosphere, subsequent nitriding reaction may be performed in the nitrogen-containing inert gas by any known method. However, an aluminum nitride powder that is particularly suitable for making electrical substrates having a very high thermal conductivity can be produced by performing a nitriding treatment in accordance with the second aspect of the present invention, as described below.

Following the heat treatment conducted in accordance with the first aspect of the present invention, the feed mixture is subjected to heat treatment where the nitrogen-containing inert gas is held at a superatmospheric pressure, preferably between 1.1 and 10 atmospheres, at a temperature of 1,250° C. or more. By performing this heat treatment, the aluminum nitride powder has low contents of cationic impurities and unreacted alumina and besides consists of fine particles. At the initial stage of nitriding reaction, the particles of unreacted alumina grows in size as well as the nitriding reaction proceeds in accordance with equation (1). If the growth of alumina particles is excessive, they are not fully converted to aluminum nitride even if the reaction (1) is continued for a prolonged period, and the resulting aluminum nitride contains a certain amount of alumina left unreacted and consist of undesirable large particles. However, the growth of alumina particles can be retarded very effectively as the pressure of the nitrogen-containing inert gas is increased. The nitrogen-containing inert gas may be held at a superatmospheric pressure for the entire period of nitriding treatment, typically for a period of about 5 to 100 hours. However, it suffices that the nitrogen-containing inert gas is maintained at a superatmospheric pressure for the period of time required to have the surface of alumina particles substantially converted to aluminum nitride; stated more specifically, the nitrogen-containing inert gas must be maintained at a superatmospheric pressure for a sufficient period to have at least 5%, preferably at least 20%, of alumina converted to aluminum nitride. Once the surface of alumina particles has been substantially converted to aluminum nitride, the pressure will no longer exhibit any significant effect to retard the growth of alumina particles and the nitriding reaction may be carried out at any pressure, either atmospheric, subatmospheric or superatmospheric. It should, however, be noted that if the reaction is carried out at a subatmospheric pressure, the residual amount of unreacted alumina will be decreased but the size of aluminum nitride particles produced will be somewhat increased. In this connection, the present inventors have found that if the reaction pressure is automatically controlled with a computer or electric relays in response to the progress of the reaction being monitored, the reaction of equation (1) can be rapidly completed without causing undue growth of the particles of alumina feed and, hence, without permitting any alumina to be left unreacted.

As described above, if the pressure in the reaction vessel is maintained at a superatmospheric pressure in the first half of the nitriding reaction for the period necessary to convert at least 5% of the alumina feed to aluminum nitride, the amount of residual alumina in the aluminum nitride powder generated is decreased and, at the same time, the size of the particles in that powder is also reduced. Although the exact mechanism by which these effects are attained is not clear, a explanation could be as follows: if the reaction pressure is either atmospheric or subatmospheric, the growth of particles in the alumina feed will occur before the reaction of equation (1) is started. Generally speaking the reaction for the formation of aluminum nitride starts at the surfaces of the particles according to equation (1), then the aluminum nitride produced from grown alumina particles in this case is composed of coarse particles and the alumina left in the central portion of the product is unable to take part in the nitriding reaction. On the other hand, if the reaction pressure is maintained at a superatmospheric level, the growth of alumina particles in the feed is retarded while the reaction (1) proceeds. Thereby yielding an aluminum nitride powder composed of particles that are substantially equal in size to those in the alumina feed, the alumina in the interior of aluminum nitride particles undergoes the nitriding reaction to a satisfactory degree.

According to the second aspect of the present invention, the heat treatment at the first of the two stages is conducted at a pressure of not higher than 0.1 atmosphere and at a temperature in the range of 1,000° to 1,400° C. If the temperature in this step is held at between 1,000° C. and 1,250° C., the growth of alumina particles is retarded very effectively, thereby contributing to the production of an aluminum nitride powder composed of even smaller particles.

The step of nitriding reaction to be carried out in the process according to the second aspect of the present invention is hereinafter described with reference to a specific embodiment. The FIGURE shows a flowchart of an apparatus that may be used to implement the process of the present invention. A closed reaction vessel (1) accommodates a carbon tray (4) that is filled up an alumina/carbon mixed feed (3) that has been heated at a temperature in the range of 1,000° to 1,400° C. at a pressure of 0.1 atmosphere or less. The vessel (1) is heated with an external heater (2), and supplied with $N_2$ gas from its bomb (5) through a gas flow meter (6). After contacting the feed mixture (3), the $N_2$ gas supplied is discharged from the vessel (1) through a control valve (9) that is controlled by means of a vessel pressure control unit (8), with the concentration of CO gas in the $N_2$ gas being computed with a CO gas analyzer (7) equipped at the exit end of the vessel (1).

The progress of reaction occurring in the feed mixture is estimated in terms of the amount of CO integrated from the start of the reaction as against the amount of the total CO that has been predetermined from the quantity of the feed on the basis of equation (1). To state more specifically, the reaction is allowed to proceed, while maintaining at a superatmospheric pressure inside the vessel (1) by means of the control unit (8) until the integrated value of CO content as detected with the analyzer (7) reaches at least 5% of the total CO content.

In accordance with a third aspect of the present invention, after contacting the feed mixture with a nitrogen-containing inert gas that is held at a pressure of not higher than 0.1 atmosphere at a temperature of 1,000° to 1,400° C. the feed mixture is further contacted with a nitrogen-containing inert gas that is maintained at 1,250° C. or more at a subatmospheric pressure between 0.2 and 0.8 atmospheres. This method is effective in producing an aluminum nitride powder that is extremely low not only in the contents of cationic impurities but also in the total oxygen content. If the second contact with the nitrogen-containing inert gas is operated at a pressure of less than 0.2 atmospheres, the resulting aluminum nitride powder could contain particles larger than 4 $\mu$m in size. It is usually advantageous for the purposes of the present invention that the reaction temperature is held at 1,250° C. or more for a period of about 5 to 100 hours (this period is hereunder referred to as "the effective reaction time"). The nitrogen-containing inert gas may be maintained at a pressure of 0.2 to 0.8 atmospheres throughout the duration of the effective reaction time. It should, however, be mentioned that reasonably satisfactory results can be attained even if the pressure of the nitrogen-containing inert gas is maintained between 0.2 and 0.8 atmospheres for a portion of the effective reaction time, preferably for a certain period of time after the start of the reaction. The pressure may be held atmospheric for the rest of the reaction.

It is not completely clear why the total oxygen content of an aluminum nitride powder can be markedly reduced by maintaining the pressure of a nitrogen-containing inert ga between 0.2 and 0.8 atmospheres during a nitriding reaction, but the reason could be as follows: the reaction between the alumina/carbon mixture and a nitrogen gas is shown by equation (1) and, hence, the free energy of this reaction is expressed by the following equation (7). As one can see from this equation, a drop in the total pressure of the reaction atmosphere would shift the chemical equilibrium to the direction that favors the progress of the reaction (1):

$$\Delta G = \Delta G^\circ + RT\ln\frac{(P_{co})^3}{P_{N2}} \quad (7)$$

According to the third aspect of the present invention, not only the oxygen content of the alumina crystal but also the content of oxygen in other forms are significantly reduced and the resulting aluminum nitride powder has a much lower total oxygen content than those produced by prior art techniques. This is probably because oxygen, that is inevitably present in the reaction system and is dissolved in the aluminum nitride crystal to form a solid solution, is in fact apt to undergo conversion to a carbon monoxide gas through reaction with carbon.

According to the fourth aspect of the present invention, the pre-nitriding step in which the feed mixture of alumina and carbon is contacted with a nitrogen-containing inert gas at a temperature of 1,000° to 1,400° C. and at a pressure of not higher than 0.1 atmosphere is followed by the already described two stages of heat treatment for effecting the nitriding reaction: (1) the nitrogen-containing inert gas is heated at a temperature of 1,250° C. or more at a superatmospheric pressure, preferably at 1.1 to 10 atmospheres, until at least 5% of the alumina feed is converted to aluminum nitride; and (2) in the same atmosphere, the pressure is held at a subatmospheric level between 0.2 and 0.8 atmospheres and at a temperature of not lower than 1,250° C. In addition to reducing the amounts of cationic impurities to extremely low levels, this method has the advantage of producing an aluminum nitride powder which is very low in the contents of unreacted alumina and total oxygen and which yet consists of sufficiently small particles.

In the two heat treatments that are conducted for effecting the nitriding reaction after the feed mixture is contacted with the nitrogen-containing inert gas at a temperature of 1,000° to 1,400° C. and at a pressure of not higher than 0.1 atmosphere, the temperature of said inert gas atmosphere is held at a temperature of 1,250° C. or more, preferably between 1,250° C. and 1,700° C., more preferably between 1,500° C. and 1,600° C. If the temperature is less than 1,250° C., the reaction of equation (1) does not take place. Even if the temperature is 1,250° C. or more, the reaction rate is slow at temperatures of less than 1,500° C. and a prolonged time is required to bring the reaction for the formation of aluminum nitride to a complete end. On the other hand, if the temperature exceeds 1,600° C., the particles of the aluminum nitride powder being produced will start to grow and excessive particle growth is anticipated above 1,700° C.

The following examples are provided for the purpose of further illustrating the present invention but are in no way to be taken as limiting.

EXAMPLES 1 TO 10 An alumina powder (100 g) and a carbon powder (40 g), each containing the impurities noted in Table 1, were mixed and ground in a ball mill, and the particles of the mixed feed were packed in a carbon tray (210 mm×210 mm×40 mm) in a thickness of 30 mm. The tray was positioned in an electric furnace having effective dimensions of 230 mm×250 mm×220 mm and a reductive nitriding reaction was carried out under a nitrogen gas stream. The heating schedule was such that in the range of from ambient temperature to 1,000° C., the temperature was raised at a rate of 100° C./h with the pressure being held atmospheric.

(A) In the range from above 1,000° C. to a predetermined temperature, the temperature was elevated at varying pressures below 0.1 atmosphere (this step of heat treatment is hereinafter referred to as step (A)).

(B) Thereafter, the temperature was elevated to a predetermined level at varying pressures, except that once the predetermined temperature was reached, it was maintained thereafter (this step is hereinafter referred to as step B)).

(C) When a predetermined temperature was not reached in step (B), the temperature was further elevated to that level at varying pressures, except that once the predetermined temperature was reached, it was maintained thereafter (this step is hereinafter referred to as step (C)).

In each of steps (A), (B) and (C), the temperature was raised at a rate of 100° C./h.

After completion of the reaction, each of the aluminum nitride powders obtained was analyzed by X-ray spectrometry to determine the contents of cationic impurities and total oxygen. For X-ray spectrometry, System 3070 of Rika Denki Kogyo Co., Ltd. was used. Determination of Na content was made by atomic absorption spectrophotometry with Model AA-646 of Shimadzu Corporation.

The results of analyses were summarized in Table 2 together with the pressure, time and temperature conditions employed for each of steps (A), (B) and (C).

Table 2 also lists the content of unreacted alumina ($\alpha$-$Al_2O_3$) present in aluminum nitride, the average size of its particles, and the total oxygen content in it. All of these factors are dependent on steps (B) and (C). Measurement of the quantity of unreacted alumina ($\alpha$-$Al_2O_3$) was conducted by X-ray diffraction; average particle size measurements were conducted with a photo extinction analyzer (Model SKN 1000 of Seishin Enterprise Co., Ltd.); and total oxygen measurements were made by X-ray spectrometry as in the case of the measurement of cationic impurity contents.

COMPARATIVE EXAMPLE

An aluminum nitride powder was prepared by repeating the procedures of Examples 1-10 except that the pressure in the electric furnace wa held at normal pressures throughout the nitriding operation. The results are also shown in Table 2.

TABLE 1

|  | Impurities (wt %) | | | | |
| --- | --- | --- | --- | --- | --- |
|  | Na | Si | Fe | Mg | Ca |
| Alumina | 0.48 | 0.051 | 0.036 | 0.015 | 0.021 |
| Carbon | 0.09 | 0.045 | 0.013 | 0.025 | 0.062 |

TABLE 2

| | | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. |
|---|---|---|---|---|---|---|---|---|---|---|---|---|---|
| Electric furnace operating conditions | Step (A) | pressure (atm.) | 0.09 | 0.08 | 0.035 | 0.025 | 0.017 | 0.015 | 0.005 | 0.005 | 0.005 | 0.001 | 1.0 |
| | | time (hr) | 2.0 | 2.5 | 2.5 | 1.5 | 1.0 | 4.0 | 1.5 | 2.5 | 2.5 | 1.5 | 2.5 |
| | | temperature range (°C.) | 1000→1200 | 1000→1250 | 1000→1250 | 1000→1150 | 1000→1100 | 1000→1400 | 1000→1150 | 1000→1250 | 1000→1250 | 1000→1150 | 1000→1250 |
| | Step (B) | pressure (atm.) | 1.0 | 0.4 | 1.8 | 1.0 | 1.0 | 1.0 | 1.0 | 1.8 | 2.0 | 1.0 | 1.0 |
| | | time (hr.) | 3.5 | 2.0 | 1.0 | 4.0 | 4.5 | 1.5 | 4.0 | 2.0 | 2.0 | 4.0 | 3.0 |
| | | temperature range (°C.) | 1200→1550 | 1250→1450 | 1250→1350 | 1150→1550 | 1100→1550 | 1400→1550 | 1150→1550 | 1250→1450 | 1250→1450 | 1150→1550 | 1250→1550 |
| | Step (C) | pressure (atm.) | 1.0 | 0.7 | 1.2 | 1.0 | 1.0 | 1.0 | 1.0 | 0.4 | 1.0 | 1.0 | 1.0 |
| | | time (hr.) | 24.5 | 25.5 | 35.0 | 24.5 | 24.5 | 24.5 | 24.5 | 25.5 | 32.0 | 19.5 | 24.5 |
| | | temperature range (°C.) | 1550→1550 | 1450→1550 | 1350→1350 | 1550→1550 | 1550→1550 | 1550→1550 | 1550→1550 | 1450→1550 | 1450→1450 | 1550→1600 | 1550→1550 |
| Impurities in aluminum nitride (wt %) | Cationic impurities | Na | 0.008 | 0.007 | <0.005 | <0.005 | <0.005 | <0.005 | <0.005 | <0.005 | <0.005 | <0.005 | 0.03 |
| | | Si | 0.024 | 0.021 | 0.008 | 0.012 | 0.002 | 0.002 | <0.001 | <0.001 | <0.001 | <0.001 | 0.068 |
| | | Fe | 0.011 | 0.010 | 0.007 | 0.009 | 0.004 | 0.002 | <0.001 | <0.001 | <0.001 | <0.001 | 0.027 |
| | | Mg | 0.008 | 0.008 | 0.007 | 0.006 | 0.003 | 0.003 | <0.002 | <0.002 | <0.002 | <0.002 | 0.01 |
| | | Ca | 0.034 | 0.033 | 0.032 | 0.030 | 0.031 | 0.028 | 0.021 | 0.019 | 0.017 | 0.014 | 0.042 |
| | α-alumina | | 0.8 | 0.3 | 0.1 | 0.8 | 0.8 | 0.9 | 0.7 | 0.1 | 0.0 | 0.7 | 0.9 |
| | total O₂ | | 1.0 | 0.5 | 0.8 | 0.9 | 1.2 | 1.0 | 0.9 | 0.4 | 0.7 | 0.7 | 1.1 |
| Average particle size of aluminum nitride (μm) | | | 4.5 | 5.1 | 2.7 | 4.5 | 4.4 | 4.7 | 4.6 | 3.2 | 1.8 | 4.9 | 5.0 |

In accordance with the present invention, an aluminum nitride powder can be produced that contains much smaller amounts of cationic impurities than those prepared by the prior art techniques. The present invention is also capable of producing an aluminum nitride powder which, in addition to containing very low levels of cationic impurities, has the advantage of containing very low total oxygen contents and/or very small, if any, amounts of unreacted alumina while featuring a satisfactorily small particle size. The aluminum nitride powder produced by the present invention is advantageous for use as the material of choice for manufacturing products, that are required to have high purity levels, such as electrical substrates having high thermal conductivity. Therefore, the present invention holds much promise for the purpose of industrial development.

While the invention has been described in detail and with reference to specific embodiments thereof, it will be apparent to one skilled in the art that various changes and modifications can be made therein without departing from the spirit and scope thereof.

What is claimed is:

1. A process for producing an aluminum nitride powder by reacting a mixture of alumina and carbon with a nitrogen gas, wherein said mixture of alumina and carbon is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing invert gas to produce said aluminum nitride powder.

2. A process for producing an aluminum nitride powder by reacting a mixture of alumina and carbon with a nitrogen gas, wherein said mixture of alumina and carbon is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a superatmospheric pressure until the conversion of the alumina feed to aluminum nitride reaches at least 5%.

3. A process as claimed in claim 2, wherein the percent conversion of alumina to aluminum nitride is determined from the integrated values of carbon monoxide gas discharged from the reaction system as against the theoretical amount of carbon monoxide gas to be generated until the reaction is completed.

4. A process for producing an aluminum nitride powder by reacting a mixture of alumina and carbon with a nitrogen gas, wherein said mixture of alumina and carbon is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a subatmospheric pressure in the range of 0.2 to 0.8 atmospheres.

5. A process as claimed in claim 4, wherein the percent conversion of alumina to aluminum nitride is determined from the integrated values of carbon monoxide gas discharged from the reaction system as against the theoretical amount of carbon monoxide gas to be generated until the reaction is completed.

6. A process for producing an aluminum nitride powder by reacting a mixture of alumina and carbon with a nitrogen gas, wherein said mixture of alumina and carbon is contacted with a nitrogen-containing inert gas at a temperature of 1,000° to 1,400° C. at a pressure of not higher than 0.1 atmosphere before a reaction is started to form aluminum nitride, and thereafter, said mixture is further contacted with a nitrogen-containing inert gas at a temperature of 1,250° C. or more at a superatmospheric pressure until the conversion of the alumina feed to aluminum nitride reaches at least 5%, followed by contacting said mixture with a nitrogen-containing inert gas at a temperature of 1,250° C. or more at a subatmospheric pressure in the range of 0.2 to 0.8 atmospheres.

7. A process as claimed in claim 6, wherein the percent conversion of alumina to aluminum nitride is determined from the integrated values of carbon monoxide gas discharged from the reaction system as against the theoretical amount of carbon monoxide gas to be generated until the reaction is completed.

* * * * *